(12) United States Patent  
Iwata

(10) Patent No.: US 6,760,314 B1  
(45) Date of Patent: Jul. 6, 2004

(54) NETWORK LOAD DISTRIBUTION SYSTEM AND NETWORK LOAD DISTRIBUTION METHOD

(75) Inventor: Atsushi Iwata, Tokyo (JP)

(73) Assignee: NEC Corporation (JP)

( * ) Notice: Subject to any disclaimer, the term of this patent is extended or adjusted under 35 U.S.C. 154(b) by 789 days.

(21) Appl. No.: 09/608,954

(22) Filed: Jun. 30, 2000

(30) Foreign Application Priority Data

Jul. 2, 1999 (JP) .......................................... 11/189665

(51) Int. Cl.[7] .............................................. H04L 12/28
(52) U.S. Cl. ...................................... 370/254; 370/238
(58) Field of Search ................................ 370/254, 255, 370/229, 230, 231, 235, 238, 237, 238.1, 252, 351, 395.31, 410, 411, 256

(56) References Cited

U.S. PATENT DOCUMENTS 5,654,958 A * 8/1997 Natarajan .................... 370/410

FOREIGN PATENT DOCUMENTS

| JP | 59-161153 | 9/1984 |
| JP | 3-219744 | 9/1991 |
| JP | 5-130144 | 5/1993 |
| JP | 11-17704 | 1/1999 |
| JP | 2001-16262 | 1/2001 |

OTHER PUBLICATIONS

Japanese Office Action dated Oct. 6, 2003 (w/ English translation of relevant portions).

Japanese Office Action dated Aug. 9, 2002 (w/ English translation of relevant portions).

* cited by examiner

*Primary Examiner*—Wellington Chin  
*Assistant Examiner*—Brenda Pham  
(74) *Attorney, Agent, or Firm*—Dickstein, Shapiro, Morin & Oshinsky, LLP.

(57) ABSTRACT

A load distribution system of a network having a plurality of nodes connected to each other with links includes a load distribution server for receiving network state information from the plurality of nodes and determining an optimum link metric based on the network state information to transmit the optimum link metric to the plurality of nodes, whereby dynamic path selection is conducted at each node based on the optimum link metric.

21 Claims, 6 Drawing Sheets

NETWORK LOAD DISTRIBUTION SYSTEM AND NETWORK LOAD DISTRIBUTION METHOD

BACKGROUND OF THE INVENTION

1. Field of the Invention

The present invention relates to dynamic path selection for determining an optimum path on the basis of link metric and, more particularly, to a network load distribution system which realizes load distribution of the entire network through monitoring of a state of the network by a network management server to periodically update link metric to be optimum.

2. Description of the Related Art

At data transmission in a network, selecting one of a plurality of communication paths which can reach a transmission destination is referred to as path selection (or routing). Various methods are employed as path selection in order to select an optimum path aiming at reducing a transmission time and improving use efficiency of a transmission path.

Static path selection is a system of in advance fixing a communication path regarded as an optimum path for each transmission destination. Communication path for each transmission destination is designated at a routing table whose reference realizes path selection.

Dynamic path selection is a system of updating the contents of a routing table to be optimum according to a traffic change and a change of a network structure. By exchanging the routing tables among nodes by using a routing protocol, information of other nodes is obtained to conduct optimum path selection.

The number of relaying devices on a communication path is called "hop value" which represents a distance between transmission and reception nodes using the communication path. Then, the actual number of relaying devices on a path passing through the minimum number of relaying devices is called "cost". These arrangement realizes optimum path selection using a link metric, that is, a distance on a network.

Main routing protocols are RIP (Routing Information Protocol) and OSPF (Open Shortest Path First).

RIP determines an optimum path based on a hop value and a cost. However, even if a cost, that is, the number of relaying devices is minimum, a transmission time is not always the shortest. OSPF resolves these shortcomings of RIP and determines an optimum path taking a congestion state of a line into consideration.

In conventional network load distribution systems using dynamic path selection of this kind, each node on its own measures a load of a link between the own node and its adjacent node and when the load exceeds a certain threshold value, a link metric is appropriately increased or decreased according to rules determined in advance, a routing table is responsively updated, and the change of the link metric is notified to other node within the network.

Japanese Patent Laid-Open (Kokai) No. Heisei 05-130144 recites a system including a link load state detection unit and a link metric change and transmission unit.

As described in the foregoing, conventional network load distribution systems have the following shortcomings.

First problem is that conventional network load distribution systems are directed to local load distribution only in the vicinity of each node and not optimum load distribution in the entire network. The reason is that since based on a load of a link between each node and its adjacent node (that is, load of only the nodes in the vicinity) that each node measured on its own, a link metric between each node and the adjacent node is appropriately increased or decreased locally, only local load distribution is realized and not load distribution taking conditions of the entire network, in addition to the adjacent nodes, into consideration.

Secondly, the related art laid open in the above-described Japanese Patent Laid-Open (Kokai) No. Heisei 05-130144 fails to determine an optimum link metric according to a dynamic change of the entire network. The reason is that since the network load distribution system recited in the above Japanese Patent Laid-Open No. 05-130144 employs a simple static method of increasing or decreasing a link metric of a link, for example, when a load of the link exceeds a specific threshold value, it is impossible to realize load distribution according to a topology change, a traffic distribution change or other change related to the entire network.

SUMMARY OF THE INVENTION

A first object of the present invention is to provide a network load distribution system enabling optimum load distribution taking the entire network into consideration in order to improve transmission efficiency, reliability and performance of the network.

Another object of the present invention is to provide a network load distribution system allowing determination of an optimum link metric and updating of a routing table in accordance with dynamic changes related to the entire network such as a network topology change and a traffic change.

According to one aspect of the invention, in a network having a plurality of nodes connected to each other with links, a network load distribution system including a load distribution server for receiving network state information from the plurality of nodes and determining an optimum link metric based on the network state information to transmit the optimum link metric to the plurality of nodes, wherein dynamic path selection is conducted at each node based on the optimum link metric.

In the preferred construction, the network state information includes network topology information indicative of a mode of connection of the node to each the adjacent node, link metric information indicative of a value of a link metric assigned to a direction of transmission from the node to each the adjacent link, and traffic flow information indicative of a traffic characteristic and a traffic parameter at the node.

In another preferred construction, the network state information includes network topology information indicative of a mode of connection of the node to each the adjacent node, link metric information indicative of a value of a link metric assigned to a direction of transmission from the node to each the adjacent link, link load information indicative of a use band and a maximum usable band on each the link adjacent to the node in a direction of transmission from the node, and traffic flow information indicative of a traffic characteristic and a traffic parameter at the node.

In another preferred construction, the load distribution server includes a path selection emulator for emulating operation of path selection for all of the nodes in the network, the path selection emulator, while referring to the network state information and changing a value of a link metric in the path selection emulator, repeatedly conducting emulation to obtain the optimum link metric.

In another preferred construction, the network state information includes network topology information indicative of a mode of connection of the node to each the adjacent node, link metric information indicative of a value of a link metric assigned to a direction of transmission from the node to each the adjacent link, and traffic flow information indicative of a traffic characteristic and a traffic parameter at the node, and the load distribution server includes a path selection emulator for emulating operation of path selection for all of the nodes in the network, the path selection emulator, while referring to the network state information and changing a value of a link metric in the path selection emulator, repeatedly conducting emulation to obtain the optimum link metric.

In another preferred construction, the network state information includes network topology information indicative of a mode of connection of the node to each the adjacent node, link metric information indicative of a value of a link metric assigned to a direction of transmission from the node to each the adjacent link, link load information indicative of a use band and a maximum usable band on each the link adjacent to the node in a direction of transmission from the node, and traffic flow information indicative of a traffic characteristic and a traffic parameter at the node, and the load distribution server includes a path selection emulator for emulating operation of path selection for all of the nodes in the network, the path selection emulator, while referring to the network state information and changing a value of a link metric in the path selection emulator, repeatedly conducting emulation to obtain the optimum link metric.

In another preferred construction, the load distribution server obtains the optimum link metric by repeatedly conducting the emulation by means of the path selection emulator while changing a value of a link metric in the path selection emulator such that the amount of a link load of each the link in the network is equal to each other.

In another preferred construction, the load distribution server obtains the optimum link metric by repeatedly conducting the emulation by means of the path selection emulator while changing a value of a link metric in the path selection emulator such that a value obtained by dividing the amount of use bands of each the link in the network by the amount of real link bands is equal to each other.

In another preferred construction, for the dynamic path selection, at each the node, a routing table of the node is updated based on the optimum link metric and furthermore, the optimum link metric is notified to and from other the node adjacent to the node by a routing protocol to update the routing table based on information from the adjacent node.

In another preferred construction, one or a plurality of the nodes in the network have the load distribution server provided therein.

In another preferred construction, one or a plurality of the nodes in the network have the load distribution server provided therein, the load distribution server notifying the node having the load distribution server provided therein to each of other nodes not having the load distribution server provided therein by the routing protocol to recognize a position of the load distribution server.

In another preferred construction, one or a plurality of the nodes in the network have the load distribution server provided therein, and when the network is connection-oriented, an existing connection is changed as well according to the optimum link metric at the time of notification of the optimum link metric to and from the adjacent node.

In another preferred construction, one or a plurality of the nodes in the network have the load distribution server provided therein, when the network is connection-oriented, an existing connection is changed as well according to the optimum link metric at the time of notification of the optimum link metric to and from the adjacent node, and at the time of changing the existing connection, after newly establishing an optimum connection while leaving the existing connection as it is and making a detour for the service of the existing connection to the new optimum connection so as to prevent interruption of services by the existing connection, the existing connection is cut off.

According to another aspect of the invention, a load distribution method in a network having a plurality of nodes connected to each other with links, wherein a load distribution server receives network state information from the plurality of nodes and determines an optimum link metric based on the network state information to transmit the optimum link metric to the plurality of nodes, and dynamic path selection is conducted at each node based on the optimum link metric.

In the preferred construction, the network state information including network topology information indicative of a mode of connection of the node to each the adjacent node, link metric information indicative of a value of a link metric assigned to a direction of transmission from the node to each the adjacent link, and traffic flow information indicative of a traffic characteristic and a traffic parameter at the node.

In another preferred construction, the network state information including network topology information indicative of a mode of connection of the node to each the adjacent node, link metric information indicative of a value of a link metric assigned to a direction of transmission from the node to each the adjacent link, link load information indicative of a use band and a maximum usable band on each the link adjacent to the node in a direction of transmission from the node, and traffic flow information indicative of a traffic characteristic and a traffic parameter at the node.

In another preferred construction, at the load distribution server, a path selection emulator for emulating operation of path selection for all of the nodes in the network repeatedly conducts emulation while referring to the network state information and changing a value of a link metric in the path selection emulator to obtain the optimum link metric.

In another preferred construction, the network state information including network topology information indicative of a mode of connection of the node to each the adjacent node, link metric information indicative of a value of a link metric assigned to a direction of transmission from the node to each the adjacent link, and traffic flow information indicative of a traffic characteristic and a traffic parameter at the node, and at the load distribution server, a path selection emulator for emulating operation of path selection for all of the nodes in the network repeatedly conducts emulation while referring to the network state information and changing a value of a link metric in the path selection emulator to obtain the optimum link metric.

In another preferred construction, the network state information including network topology information indicative of a mode of connection of the node to each the adjacent node, link metric information indicative of a value of a link metric assigned to a direction of transmission from the node to each the adjacent link, link load information indicative of a use band and a maximum usable band on each the link adjacent to the node in a direction of transmission from the node, and traffic flow information indicative of a traffic characteristic and a traffic parameter at the node, and at the load distribution server, a path selection emulator for emulating operation of path selection for all of the nodes in the network repeatedly conducts emulation while referring to the network state information and changing a value of a link metric in the path selection emulator to obtain the optimum link metric.

In another preferred construction, for the dynamic path selection, at each the node, a routing table of the node is updated based on the optimum link metric and furthermore the optimum link metric is notified to and from other the node adjacent to the node by a routing protocol to update the routing table based on information from the adjacent node.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings.

DESCRIPTION OF THE PREFERRED EMBODIMENT

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

Figure 1:
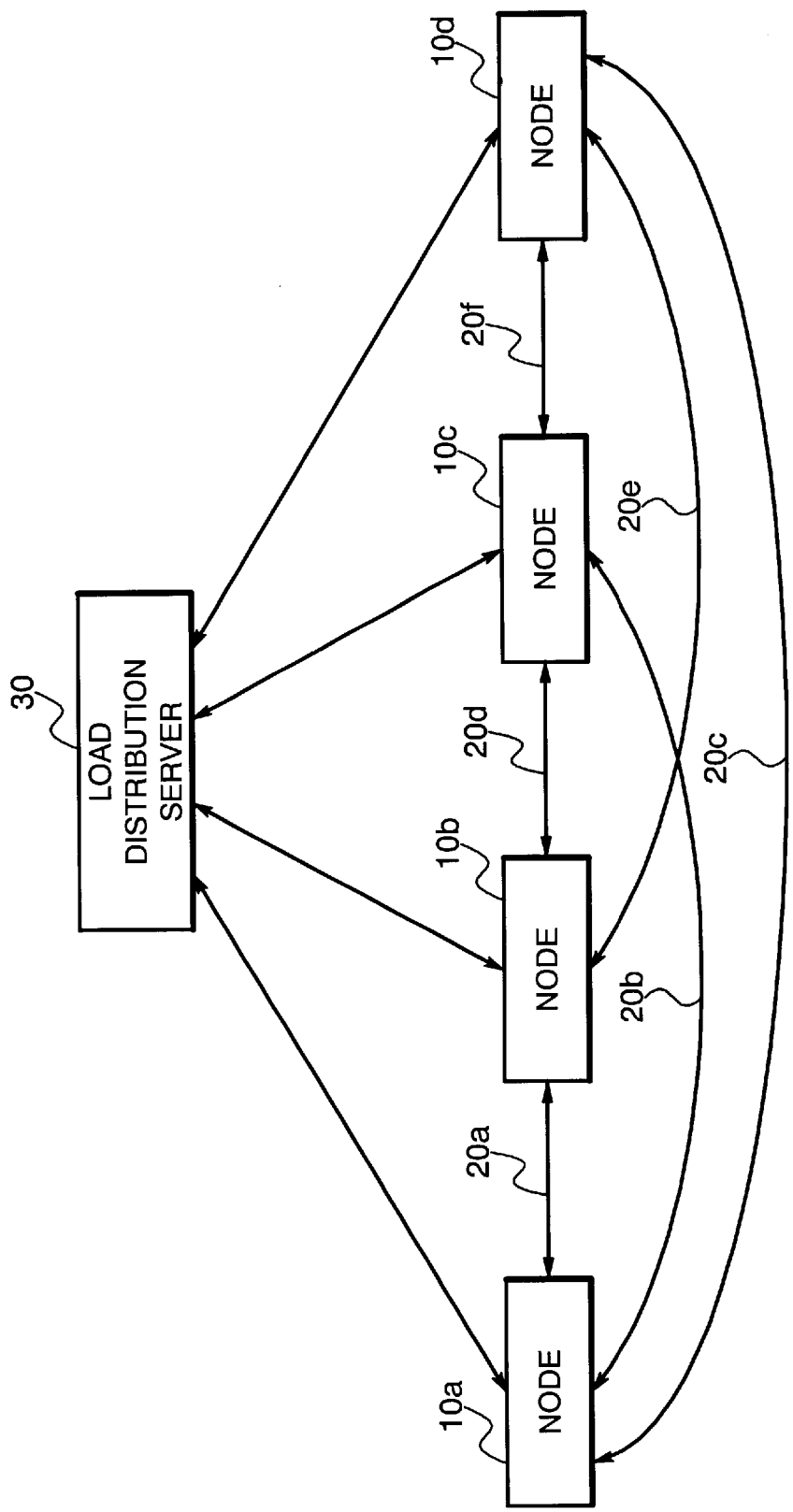
FIG. 1 is a block diagram showing a structure of a network load distribution system according to a first embodiment of the present invention.

FIG. 1 is a block diagram showing a structure of a network load distribution system according to a first embodiment of the present invention.

With reference to FIG. 1, the network load distribution system according to the first embodiment of the present invention includes a plurality of nodes 10a, 10b, 10c and 10d connected to each other by links 20a, 20b, 20c, 20d, 20e and 20f, and a load distribution server 30 connected to these plurality of nodes 10a, 10b, 10c and 10d.

The nodes 10a, 10b, 10c and 10d, each of which is constituted by a router or a switching system, are for transmitting and receiving data through the respective links 20a, 20b, 20c, 20d, 20e and 20f.

The load distribution server 30 has a function of receiving information regarding a state of the network from the respective nodes 10a, 10b, 10c and 10d, responsively calculating an optimum link metric and notifying each node of the result to conduct load distribution.

Figure 2:
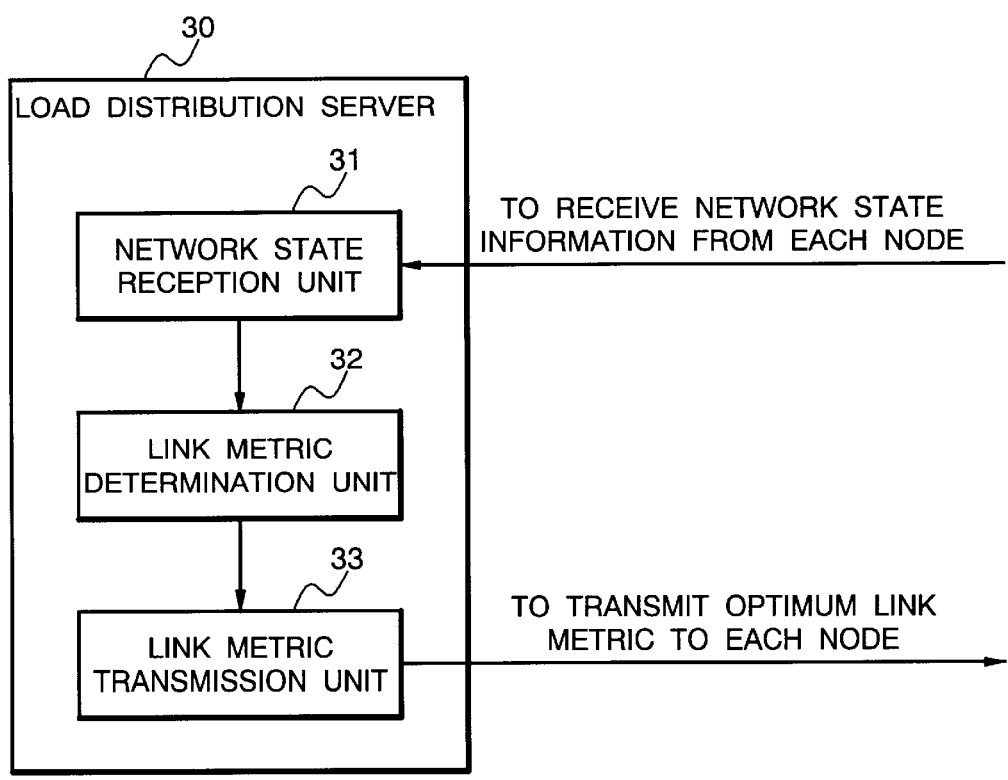
FIG. 2 is a block diagram showing a structure of a load distribution server according to the first embodiment of the present invention.

FIG. 2 is a block diagram showing a structure of the load distribution server 30 according to the first embodiment of the present invention.

With reference to FIG. 2, the load distribution server 30 of the first embodiment of the present invention includes a network state reception unit 31, a link metric determination unit 32 and a link metric transmission unit 33.

The network state reception unit 31 receives network state information from all of the nodes 10a, 10b, 10c and 10d and transmits the received network state information, that is, network topology information, link metric information, link load information and traffic flow information, to the link metric determination unit 32.

The link metric determination unit 32 recognizes, based on the received network state, topology of the entire network, a link metric and a link load currently set at each of the links 20a, 20b, 20c, 20d, 20e and 20f, a traffic characteristic and a parameter of a traffic flow, determines an optimum link metric of each of the links 20a, 20b, 20c, 20d, 20e and 20f using these information and transmits the link metric to the link metric transmission unit 33.

The link metric determination unit 32 has a path selection emulator 321 provided therein which repeats emulation of path selection on the network while little by little modifying a value of a link metric such that a link load obtained by the emulation has an proper value, thereby obtaining an optimum link metric.

The link metric transmission unit 33 transmits an optimum link metric determined at the link metric determination unit 32 to each of the nodes 10a, 10b, 10c and 10d.

Figure 3:
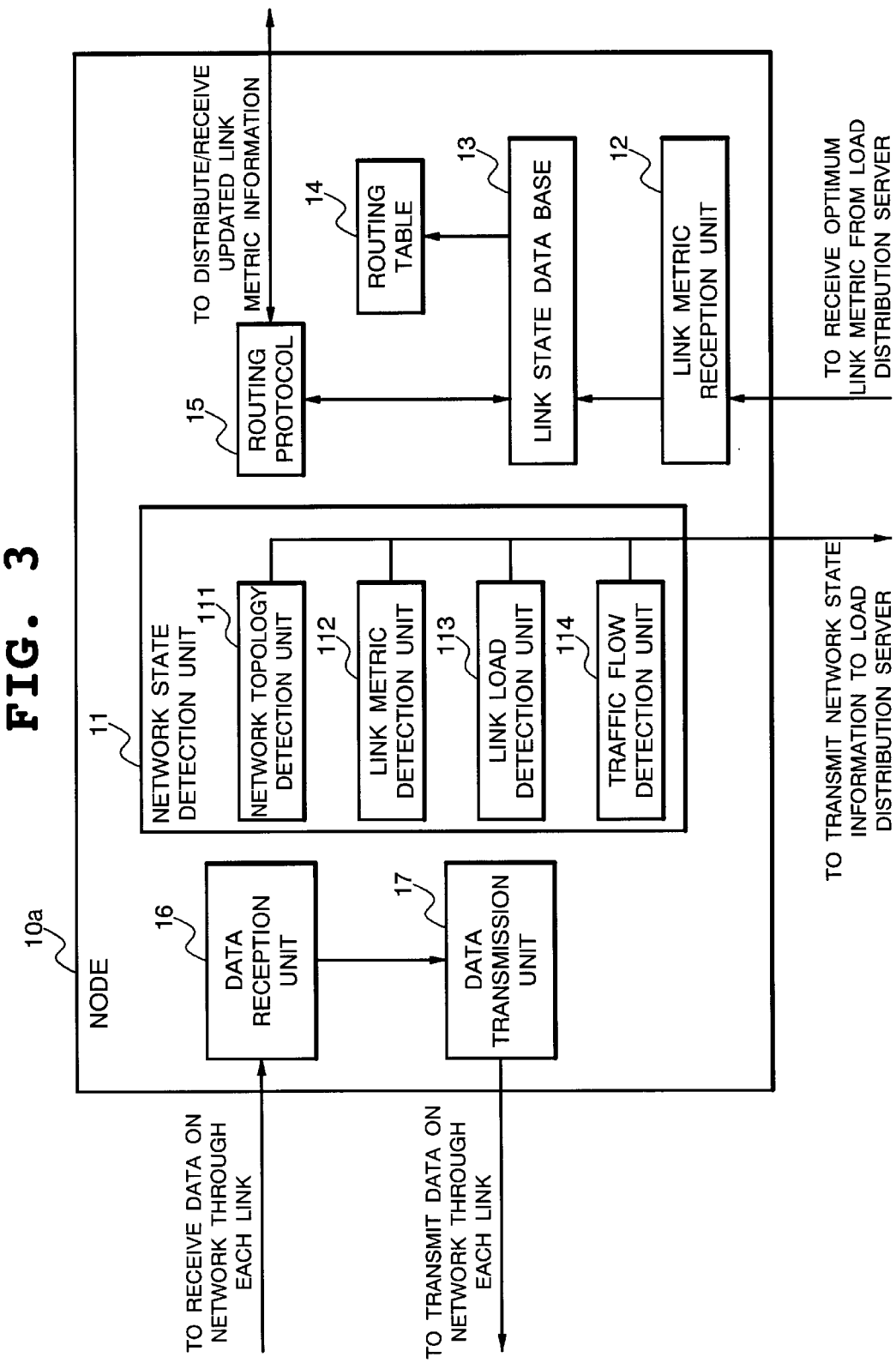
FIG. 3 is a block diagram showing a structure of a node according to the first embodiment of the present invention.

FIG. 3 is a block diagram showing a structure of the node 1a according to the first embodiment of the present invention.

With reference to FIG. 3, the node 10a of the first embodiment of the present invention includes a network state detection unit 11, a link metric reception unit 12, a link state data base 13, a routing table 14, a routing protocol 15, a data reception unit 16 and a data transmission unit 17.

Data transmission and reception on the network by the node 10a is conducted by the data reception unit 16 and the data transmission unit 17.

The data reception unit 16 receives data from the adjacent nodes 10b, 10c and 10d connected by the links 20a, 20b and 20c.

The data transmission unit 17, similarly with respect to the adjacent nodes 10b, 10c and 10d connected by the links 20a, 20b and 20c, refers to the data transmission destinations and the routing table 14 to determine adjacent nodes to which the data is to be sent next and transmits the data to the determined nodes.

The function of the node 10*a* to distribute a load on data transmission and reception on the network is realized by the network state detection unit 11, the link metric reception unit 12, the link state data base 13, the routing table 14 and the routing protocol 15.

The network state detection unit 11 detects a state of the network at the node 10*a* and transmits the detection result to the load distribution server 30.

The network state detection unit 11 includes a network topology detection unit 111, a link metric detection unit 112, a link load detection unit 113 and a traffic flow detection unit 114.

The network topology detection unit 111 detects network topology information about by which link and how the node 10*a* is connected with each adjacent node. More specifically, the unit detects, for example, connection of the node 10*a* with the node 10*b* through the link 20*a*.

The link metric detection unit 112 detects a link metric assigned to a transmission direction from the node 10*a* to each of the adjacent links 20*a*, 20*b* and 20*c*. The reason why the direction is prescribed is that a link metric might differ in a transmission direction and a reception direction even on the same link in some cases.

The link load detection unit 113 detects a link load on each of the links 20*b*, 20*c* and 20*d* in the transmission direction from the node 10*a*. Kinds of link loads detected here by the link load detection unit 113 is two, a current use band and a maximum band usable by a link.

The traffic flow detection unit 114 detects a traffic characteristic and a traffic parameter for each flow.

The link metric reception unit 12 receives an optimum link metric transmitted from the load distribution server 30, updates the link state data base 13 with the optimum link metric and recalculates and updates the routing table 14 using the updated link state data base 13. Recalculation of the routing table 14 here is obtaining a minimum cost path in the entire network based on an updated optimum link metric in the link state data base 13 through recalculation.

Furthermore, the link metric reception unit 12 transmits the updated optimum link metric as path selection information to other nodes 10*b*, 10*c* and 10*d* based on the routing protocol 15, and conversely, updated optimum link metrics at other nodes 10*b*, 10*c* and 10*d* are transmitted as path selection information to the node 10*a*.

Used as the routing protocol 15 is a link-state type OSPF (Open Shortest Path Fast) routing protocol in a case of a router. In a case of a switching system, using, for example, a link-state type PNNI (Private Network-Network Interface) routing protocol realizes the same processing.

Next, detailed description will be made of operation of the network load distribution system according to the first embodiment of the present invention.

Although description will be here given to the operation between the node 10*a* and the distribution server 30, the same is applied to operation between the server and other nodes.

First, at the node 10*a*, the network state detection unit 11 detects four network state information, network topology information from the network topology detection unit 111, current link metric information from the link metric detection unit 112, link load information from the link load detection unit 113 and traffic flow information from the traffic flow detection unit 114 and transmits the information to the load distribution server 30.

Next, at the load distribution server 30, the network state reception unit 31 receives the network state information sent from each node 10*a* and transmits the information to the link metric determination unit 32.

Next, the link metric determination unit 32 recognizes a current state of the entire network from the network state information sent from each node 10*a*, determines an optimum link metric of each link and notifies the link metric transmission unit 33 of the value of the determined link metric.

Next, the link metric transmission unit 33 transmits to the node 10*a* an optimum link metric of each of the links 20*a*, 20*b* and 20*c* in the transmission direction from the node 10*a*.

Again at each node 10*a*, the link metric reception unit 12 receives the optimum link metric from the load distribution server 30 and makes the optimum link metric reflected on the link state data base 13, thereby recalculating and updating the routing table 14 within the node 10*a*. The routing table 14 is obtained by recalculating a minimum cost path of the entire network using an optimum link metric.

Thereafter, the updated link metric information is distributed as path selection information to the adjacent nodes 10*b*, 10*c* and 10*d* by the routing protocol 15. On the other hand, the other nodes 10*b*, 10*c* and 10*d* similarly distribute the updated link metric information to the node 10*a* as the path selection information and upon reception of the information, the routing protocol 15 stores the information first in the link state data base 13.

Thereafter, as the link state data base 13 is updated, a minimum cost path is again calculated to update the routing table 14.

Through the foregoing procedures, all of the nodes 10*a*, 10*b*, 10*c* and 10*d* update their own new link metric information, as well as notifying other nodes of the information, so that each node conducts path selection using the routing table 14 based on the new link metric information.

In other words, traffic load will be actually distributed according to the calculation by the link metric determination unit 32 in the load distribution server 30.

The foregoing processing of the load distribution server 30 and each of the nodes 10*a*, 10*b*, 10*c* and 10*d* is periodically executed to dynamically respond to a change of topology, a link metric, a link load and a traffic flow as time elapses, thereby constantly achieving traffic load distribution.

Periodic execution cycle is determined according to a speed of a network change and requirements for load distribution.

Figure 4:
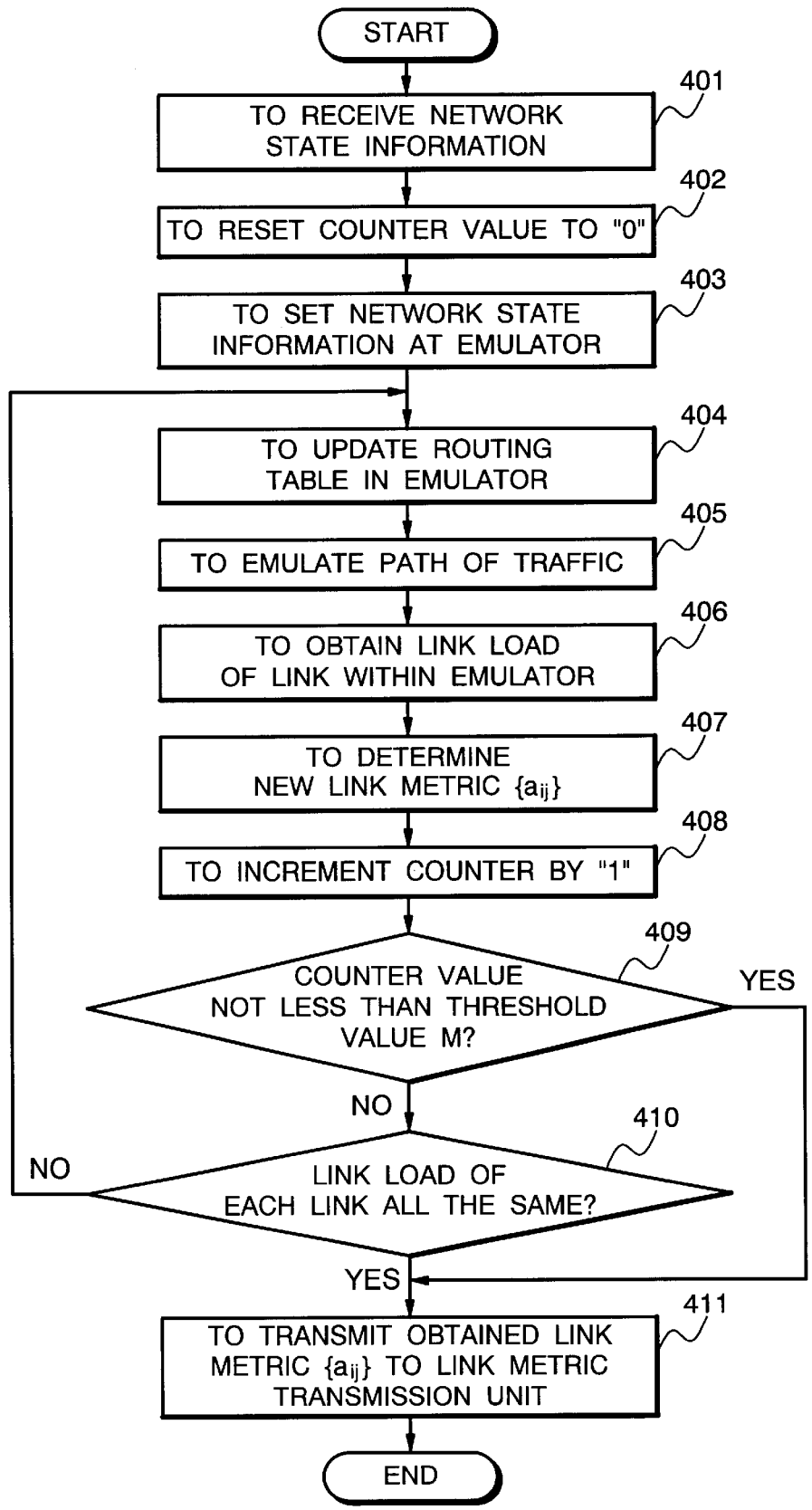
FIG. 4 is a flow chart for use in explaining optimum link metric determination processing by a link metric determination unit according to the first embodiment of the present invention.

FIG. 4 is a flow chart for use in explaining optimum link metric determination processing conducted by the link metric determination unit 32 according to the first embodiment of the present invention.

In the determination processing, each variable is determined as follows.

The total number of nodes is represented as "N", nodes in the network as "node i" and "node j" (i, j≦N), the total number of paths between the node i and the node j as "Kij", a current link metric value from the node i to the node j adjacent to each other as "Aij", optimized link metric value to be obtained from the node i to the node j adjacent to each other as "Bij", a current link load from the node i to the node j adjacent to each other as "Cij" and traffic flow by a path k (k≦Kij) from the node i to the node j in the network as "Tijk".

First, the link metric determination unit 32 receives network state information from all the nodes (node 1 through node N) of the network through the network state reception unit 31 (Step 401).

The network state information includes all the information of network topology information, link metric information {Aij: nodes i and j are adjacent to each other}, link load information {Cij: nodes i and j are adjacent to each other} and traffic flow information {Tijk: i ≠j, k≦Kij}.

Next, based on these received network state information, calculate an optimum new link metric Bij according to the following procedures.

Reset a path selection emulator 321 in the link metric determination unit 32 to "0" (Step 402).

Set the network state information at the internally provided path selection emulator 321 as initial information (Step 403). Here, store the variable link metric value {Aij}, the link load {Cij} and the traffic flow {Tijk} in a memory for calculation within the path selection emulator 321 as {aij}, {cij} and {Tijk}, respectively.

The path selection emulator 321 emulates the same processing as the actual calculation of the routing table 14 and the actual data path selection according to the routing table 14 conducted by all the nodes 1 ~N.

The path selection emulator 321 first calculates a minimum cost path from the network topology information and the link metric {aij} to conduct pseudo updating of the routing table 14 of each of all the nodes in the path selection emulator 321 (Step 404).

When a plurality of paths are the same minimum cost paths here, register all the paths in the routing table 14 within the emulator to control a plurality of paths such that traffic load is distributed among the paths.

Thereafter, make the traffic flow {Tijk} virtually flow into the node in the emulator to specifically calculate through which path the traffic flows (Step 405).

Upon determination of new paths for all the traffic flows {Tijk}, expected link loads {cij: nodes i and j are adjacent to each other} of links among all the nodes 1 ~N are obtained then (Step 406).

Then, select a link from a node x to a node y (x≦N, y≦N, nodes x and y are adjacent to each other) having the highest load among thus obtained link loads {cij}. Then, with respect to the value of the current link metric {aij}, add a positive number δ only to a link metric value axy corresponding to the link {x, y} and determine the obtained value as a new link metric {aij} (Step 407).

Increment the counter by "1" (Step 408) and if the counter value exceeds a certain threshold value M, consider that repetitive calculation for obtaining an optimum link metric has been made more than a fixed number of times to end repetition of the emulation (Step 409) and transmit the link metric {aij} obtained at that time point as a new link metric {Bij} to the link metric transmission unit 33 (Step 411).

Also when a value of a link load {cij} of each link is all the same, considering that an optimum link metric is already obtained, end repetition of the emulation (Step 410) to transmit the link metric {aij} obtained at that time point as a new link metric {Bij} to the link metric transmission unit 33 (Step 411).

In neither case, again return to Step 404 to repeat the emulation based on a new link metric {aij}.

Thus obtained optimum link metric is transmitted by the link metric transmission unit 33 to each of the nodes 1 ~N.

Although in the above-described determination processing by the link metric determination unit 32, no link load information {Cij} as initial information is used, the information can be used in a case where the amount of loads is used for determining whether load distribution is to be conducted or not, that is, in a case, for example, where no load distribution is to be conducted before the amount of loads exceeds a certain value. In addition, referring to the information to find if there is a big difference from a link load {cij} obtained by the path selection emulator 321 at the first emulation can lead to checking whether network state information is correctly received or not. The link load information {Cij} therefore may not be included in the network state information.

Similarly, the traffic flow information {Tijk} which is initial information may not necessarily be information for each path but be information about every two nodes as the information about the amount of traffic flow. Also, referring to the information to find if there is a big difference from the value of the traffic flow information {tijk} obtained by the path selection emulator 321 at the first emulation can lead to checking whether the network state information is correctly received or not. The traffic flow information therefore needs not be collected for each path.

As described in the foregoing, the present embodiment enables optimum load distribution in the entire network because the load distribution server 30 centrally collects network states from all the nodes 10a, 10b, 10c and 10d in the network and determines an optimum link metric based on the information to dynamically select a path.

The present embodiment also enables load distribution quickly responding to a dynamic change related to the entire network such as a topology change and a traffic change of the network because a network state is periodically obtained to determine an optimum link metric.

Next, a second embodiment of the present invention will be described with reference to the drawings.

Figure 5:
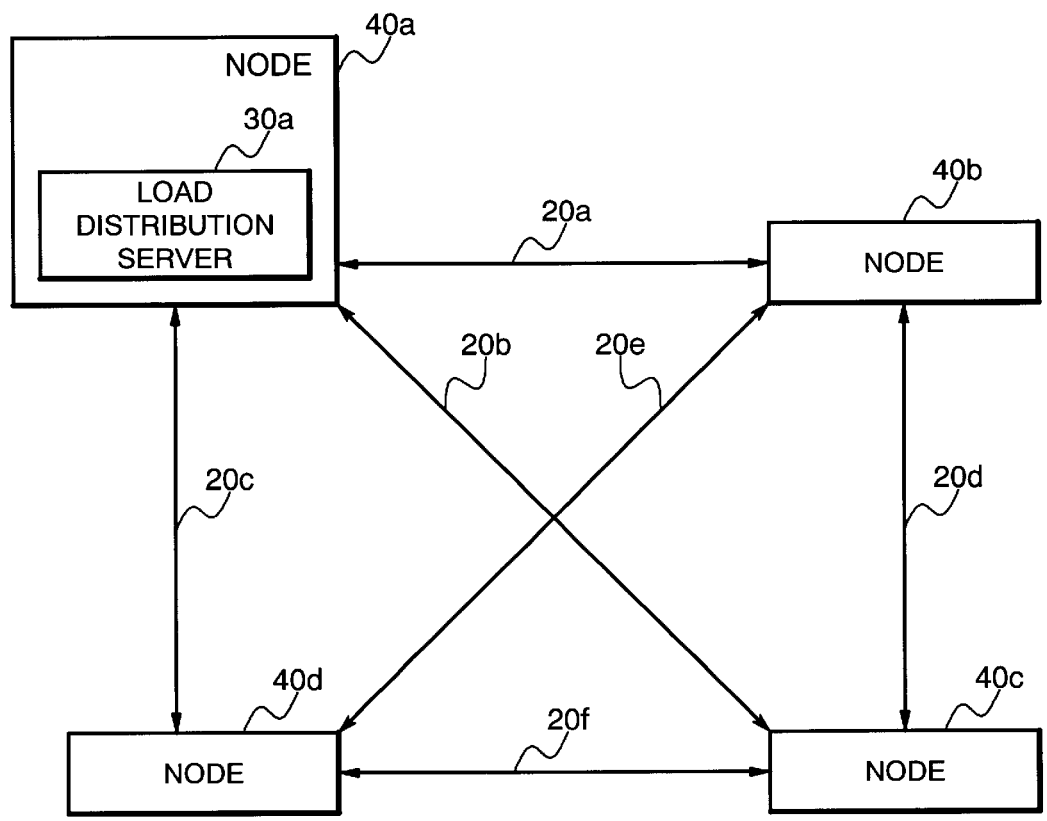
FIG. 5 is a block diagram showing a structure of a network load distribution system according to a second embodiment of the present invention.

FIG. 5 is a block diagram showing a structure of a network load distribution system according to the second embodiment of the present invention.

With reference to FIG. 5, the network load distribution system according to the second embodiment of the present invention differs from the network load distribution system according to the first embodiment shown in FIG. 1 in that a load distribution server 30a is not disposed independently of each node for conducting data transmission and that the function of the load distribution server 30a is mounted as hardware on an arbitrary one node 40a.

The network load distribution system of the present embodiment conducts functionally the same operation as that of the first embodiment. Exchanging information of the node 40a which mounts the load distribution server 30a thereon by the routing protocol 15 (in OSPF, for example, the information can be exchanged using Opaque LSA) enables all the nodes 40b, 40c and 40d which are not mounted with the load distribution server 30a to automatically recognize a position of the node 40a which mounts the load distribution server 30a thereon, thereby realizing transmission and reception to and from the load distribution server 30a.

The node 40a which mounts the load distribution server 30a thereon is not necessarily one but a plurality of nodes. In a case where the load distribution server 30a is provided in each of a plurality of nodes, the server 30a may be equivalent to each other or may have divisional functions.

As described in the foregoing, since in the present embodiment, the function of the load distribution server 30a is provided in the node 40a, it is necessary neither to dispose the load distribution server 30a independently of each node which conducts data transmission nor to establish a special line for the communication between the load distribution server 30a and each of the nodes 40a, 40b, 40c and 40d. The present embodiment has, in addition to the effect of the first embodiment, the effect of realizing a network load distribution system of a simpler structure whose installation is easy.

Third embodiment of the present invention will be described in detail with reference to the drawing.

Figure 6:
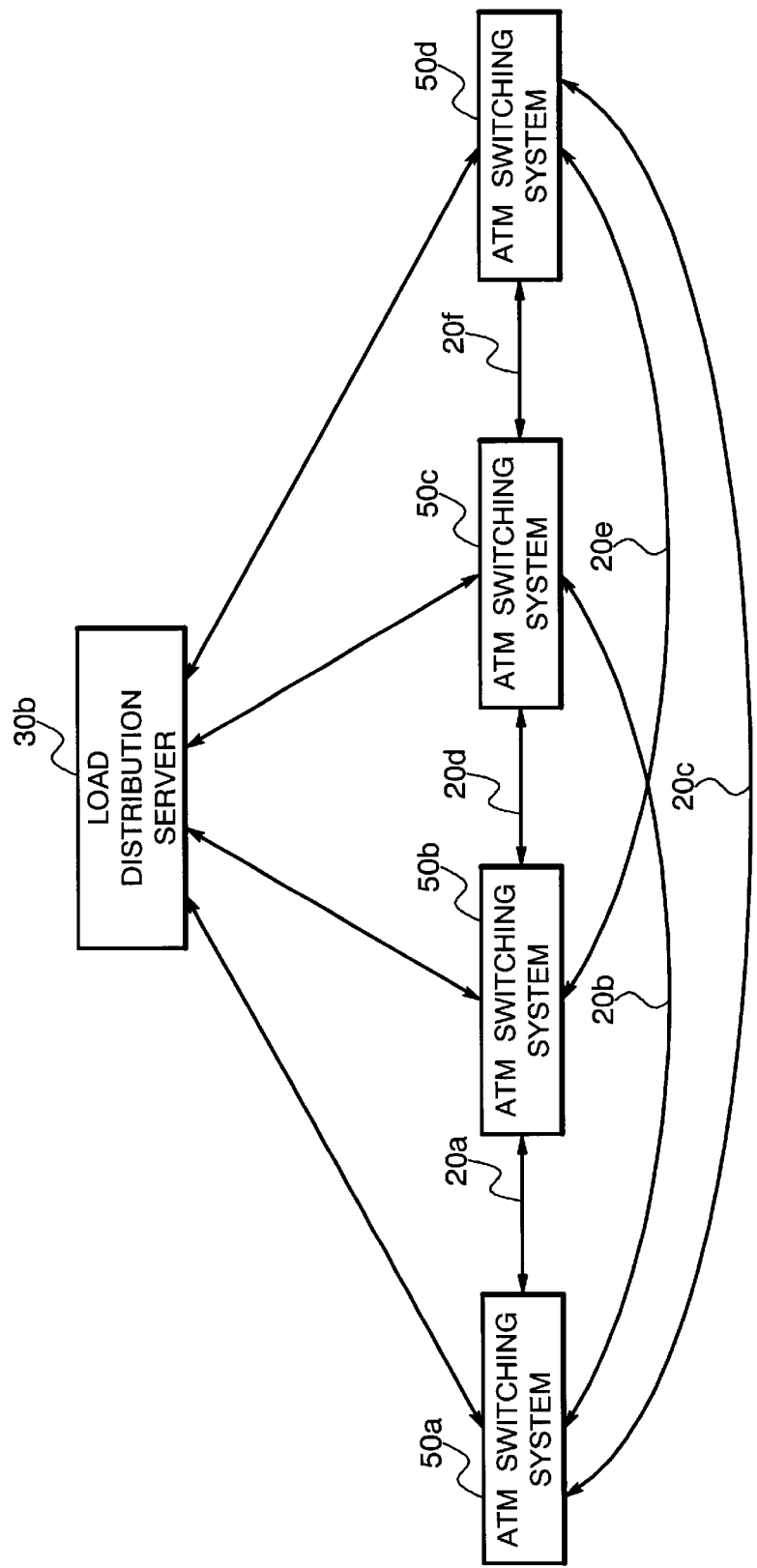
FIG. 6 is a block diagram showing a structure of a network load distribution system according to a third embodiment of the present invention.

FIG. 6 is a block diagram showing a structure of a network load distribution system according to the third embodiment of the present invention.

With reference to FIG. 6, the network load distribution system according to the present embodiment is implemented in a connectionless-type network using ATM switching systems 50a, 50b, 50c and 50d.

The network load distribution system according to the first embodiment has been described mainly with respect to connectionless path selection. In a case where the present invention is implemented in a connection-type network in which each data transmission path is set in advance before the start of transmission such as an ATM, it is desirable to partly add a control procedure as described in the following.

When a load distribution server 30b calculates an optimum new link metric according to network state information and finishes notifying the ATM switching systems 50a, 50b, 50c and 50d of the result, in a case of direct application of the first embodiment, the ATM switching systems 50a, 50b, 50c and 50d change none of communication path setting for a cell being transmitted and sets a communication path only for a cell whose transmission is newly requested by using an updated optimum link metric to conduct load distribution.

In other words, it is the procedure of making no change in an existing connection. As the third embodiment, there is accordingly a case where upon reception of an optimum new link metric by the ATM switching systems 50a, 50b, 50c and 50d, path selection is conducted according to a new link metric with respect to all the existing connections.

In the present embodiment, since while path selection is being conducted, a connection might be cut off to interrupt service on the existing connections, a system aiming at preventing interruption of services is employed in which with an existing VCC left as it is, first an optimum VCC (Virtual Channel Connection) is set and after making a detour for the existing service to the newly set VCC, the existing VCC is cut off.

As described in the foregoing, the present embodiment has the effect, in addition to the effect of the first embodiment, of realizing a network load distribution system of high performance and efficiency by changing the setting for data being transferred whose communication path is already set to a latest optimum path when load distribution is conducted in a connection-type network.

Although the present invention has been described with respect to the preferred modes of implementation and embodiments in the foregoing, the present invention is not necessarily limited to the above modes of implementation and embodiments but embodied as variations within the scope of its technical idea.

Load distribution can employ various methods according to an intention of a network manager, for example, similarly to the above method which has been described with reference to FIG. 4.

For the determination whether load distribution is to be conducted, a method of conducting no load distribution until a load exceeds a certain value and starting load distribution when the same exceeds a certain load threshold value and a method of conducting load distribution at any time even when a load is low are enabled by referring to link load information in network state information as initial information of load distribution.

Also, a method of conducting load distribution so as to make a relative load rate be equal and a method of conducting load distribution so as to make a residual band left by a load be equal are enabled following the flow chart of FIG. 4 by setting link load information respectively as a value of (use band/real link band), that is, a value obtained by dividing the amount of use bands by the amount of real link bands and as a value of a residual band left by a load.

Combination of the third embodiment and the second embodiment is also possible.

More specifically, in the method of the second embodiment, the function of the load distribution server 30a can be provided within an arbitrary one of the ATM switching systems 50a of the third embodiment.

First, optimum load distribution is possible in the entire network. The reasons are that a load distribution server centrally collects network states from all the nodes in the network and based on the information, determines an optimum link metric for optimum load distribution and distributes the result to each node and that the optimum link metric is distributed to all the nodes by a routing protocol, whereby the routing table of each node is updated based on the link metric.

Secondly, an optimum link metric is determined according to dynamic changes related to a network such as a change of topology of the network and a change of traffic to modify a routing table. The reason is that a network state is periodically obtained to calculate an optimum link metric.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. An apparatus for use in a network having a plurality of nodes connected with links, the apparatus comprising:
 a network load distribution system including a load distribution server for receiving network state information from said plurality of nodes and determining an optimum link metric based on said network state information and transmitting said optimum link metric to said plurality of nodes, wherein
 dynamic path selection is conducted at each node based on said optimum link metric.

2. The apparatus according to claim 1, wherein said network state information includes:
 network topology information indicative of a mode of connection of said node to each said adjacent node;
 link metric information indicative of a value of a link metric assigned to a direction of transmission from said node to each said adjacent link; and
 traffic flow information indicative of a traffic characteristic and a traffic parameter at said node.

3. The apparatus a according to claim 1, wherein said network state information includes:
  network topology information indicative of a mode of connection of said node to each said adjacent node;
  link metric information indicative of a value of a link metric assigned to a direction of transmission from said node to each said adjacent link;
  link load information indicative of a use band and a maximum usable band on each said link adjacent to said node in a direction of transmission from said node; and
  traffic flow information indicative of a traffic characteristic and a traffic parameter at said node.

4. The apparatus according to claim 1, wherein said load distribution server includes:
  a path selection emulator for emulating operation of path selection for all of said nodes in said network,
  said path selection emulator, while referring to said network state information and changing a value of a link metric in said path selection emulator, repeatedly conducting emulation to obtain said optimum link metric.

5. The apparatus according to claim 1, wherein
said network state information includes:
  network topology information indicative of a mode of connection of said node to each said adjacent node;
  link metric information indicative of a value of a link metric assigned to a direction of transmission from said node to each said adjacent link, and
  traffic flow information indicative of a traffic characteristic and a traffic parameter at said node; and
said load distribution server includes
  a path selection emulator for emulating operation of path selection for all of said nodes in said network,
  said path selection emulator, while referring to said network state information and changing a value of a link metric in said path selection emulator, repeatedly conducting emulation to obtain said optimum link metric.

6. The apparatus according to claim 1, wherein
said network state information includes:
  network topology information indicative of a mode of connection of said node to each said adjacent node;
  link metric information indicative of a value of a link metric assigned to a direction of transmission from said node to each said adjacent link;
  link load information indicative of a use band and a maximum usable band on each said link adjacent to said node in a direction of transmission from said node; and
  traffic flow information indicative of a traffic characteristic and a traffic parameter at said node; and
said load distribution server includes:
  a path selection emulator for emulating operation of path selection for all of said nodes in said network,
  said path selection emulator, while referring to said network state information and changing a value of a link metric in said path selection emulator, repeatedly conducting emulation to obtain said optimum link metric.

7. The apparatus according to claim 4, wherein said load distribution server obtains said optimum link metric by repeatedly conducting said emulation by means of said path selection emulator while changing a value of a link metric in said path selection emulator such that a link load of each said link in said network is equal for each said link.

8. The apparatus according to claim 4, wherein said load distribution server obtains said optimum link metric by repeatedly conducting said emulation by means of said path selection emulator while changing a value of a link metric in said path selection emulator such that a value obtained by dividing the amount of use bands of each said link in said network by the amount of real link bands is equal for each said link.

9. The apparatus according to claim 1, wherein for said dynamic path selection, at each said node, a routing table of said node is updated based on said optimum link metric and furthermore, said optimum link metric is notified to and from other said node adjacent to said node by a routing protocol to update the routing table based on information from said adjacent node.

10. The apparatus according to claim 1, wherein one or a plurality of said nodes in said network have said load distribution server provided therein.

11. The apparatus according to claim 1, wherein one or a plurality of said nodes in said network have said load distribution server provided therein, said load distribution server notifying said node having said load distribution server provided therein to each of other nodes not having said load distribution server provided therein by said routing protocol to recognize a position of the load distribution server.

12. The apparatus according to claim 1, wherein one or a plurality of said nodes in said network have said load distribution server provided therein, and when said network is connection-oriented, an existing connection is changed as well according to said optimum link metric at the time of notification of said optimum link metric to and from said adjacent node.

13. The apparatus according to claim 1, wherein one or a plurality of said nodes in said network have said load distribution server provided therein, when said network is connection-oriented, an existing connection is changed as well according to said optimum link metric at the time of notification of said optimum link metric to and from said adjacent node, and at the time of changing said existing connection, after newly establishing an optimum connection while leaving said existing connection as it is and making a detour for the service of said existing connection to said new optimum connection so as to prevent interruption of services by said existing connection, said existing connection is cut off.

14. A load distribution method in a network having a plurality of nodes connected with links, wherein:
  a load distribution server receives network state information from said plurality of nodes and determines an optimum link metric based on said network state information to transmit said optimum link metric to said plurality of nodes; and
  dynamic path selection is conducted at each node based on said optimum link metric.

15. The network load distribution method as set forth in claim 14, wherein said network state information includes:
  network topology information indicative of a mode of connection of said node to each said adjacent node;
  link metric information indicative of a value of a link metric assigned to a direction of transmission from said node to each said adjacent link; and
  traffic flow information indicative of a traffic characteristic and a traffic parameter at said node.

16. The network load distribution method as set forth in claim 14, wherein said network state information includes:

network topology information indicative of a mode of connection of said node to each said adjacent node;

link metric information indicative of a value of a link metric assigned to a direction of transmission from said node to each said adjacent link;

link load information indicative of a use band and a maximum usable band on each said link adjacent to said node in a direction of transmission from said node; and traffic flow information indicative of a traffic characteristic and a traffic parameter at said node.

17. The network load distribution method as set forth in claim 14, wherein at said load distribution server, a path selection emulator for emulating operation of path selection for all of said nodes in said network repeatedly conducts emulation while referring to said network state information and changing a value of a link metric in said path selection emulator to obtain said optimum link metric.

18. The network load distribution method as set forth in claim 14, wherein said network state information includes:
  network topology information indicative of a mode of connection of said node to each said adjacent node;
  link metric information indicative of a value of a link metric assigned to a direction of transmission from said node to each said adjacent link; and
  traffic flow information indicative of a traffic characteristic and a traffic parameter at said node; and said load distribution server includes:
  a path selection emulator for emulating operation of path selection for all of said nodes in said network repeatedly conducts emulation while referring to said network state information and changing a value of a link metric in said path selection emulator to obtain said optimum link metric.

19. The network load distribution method as set forth in claim 14, wherein said network state information includes:
  network topology information indicative of a mode of connection of said node to each said adjacent node;
  link metric information indicative of a value of a link metric assigned to a direction of transmission from said node to each said adjacent link;
  link load information indicative of a use band and a maximum usable band on each said link adjacent to said node in a direction of transmission from said node; and
  traffic flow information indicative of a traffic characteristic and a traffic parameter at said node; and said load distribution server includes:
  a path selection emulator for emulating operation of path selection for all of said nodes in said network repeatedly conducts emulation while referring to said network state information and changing a value of a link metric in said path selection emulator to obtain said optimum link metric.

20. The network load distribution method as set forth in claim 14, wherein for said dynamic path selection, at each said node, a routing table of said node is updated based on said optimum link metric and furthermore said optimum link metric is notified to and from other said node adjacent to said node by a routing protocol to update the routing table based on information from said adjacent node.

21. The apparatus according to claim 1, wherein at least one node is connected to less than all the nodes.

* * * * *